(12) United States Patent
Yano

(10) Patent No.: US 6,600,526 B2
(45) Date of Patent: Jul. 29, 2003

(54) LCD DEVICE HAVING AN IMPROVED BACKLIGHT UNIT

(75) Inventor: Takakazu Yano, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 293 days.

(21) Appl. No.: 09/813,822

(22) Filed: Mar. 22, 2001

(65) Prior Publication Data

US 2001/0026336 A1 Oct. 4, 2001

(30) Foreign Application Priority Data

Mar. 23, 2000 (JP) .................................... 2000-082382

(51) Int. Cl.$^7$ ............................................. G02F 1/1335
(52) U.S. Cl. ............................................. 349/65; 362/27
(58) Field of Search ............................... 362/27, 37, 26; 345/8; 349/65

(56) References Cited

U.S. PATENT DOCUMENTS 6,309,081 B1 * 10/2001 Furihata ...................... 362/31
6,502,945 B2 *  1/2003 Kim .............................. 362/27

FOREIGN PATENT DOCUMENTS

| JP | 6-87937 | 12/1994 |
| JP | 6-347784 | 12/1994 |
| JP | 7-49497 | 2/1995 |
| JP | 10-162617 | 6/1998 |
| JP | 10-206643 | 8/1998 |
| JP | 10-333143 | 12/1998 |
| JP | 11-52355 | 2/1999 |
| JP | 11-133401 | 5/1999 |
| JP | 11-149072 | 6/1999 |
| JP | 2000-66204 | 3/2000 |
| JP | 2000-206527 | 7/2000 |

OTHER PUBLICATIONS

Japanese Office Action dated Feb. 25, 2002 with partial English translation.

* cited by examiner

Primary Examiner—John F. Niebling
Assistant Examiner—Andre' C Stevenson
(74) Attorney, Agent, or Firm—McGinn & Gibb, PLLC (57) ABSTRACT

A LCD device has a backlight unit disposed at the rear side of the display panel. The backlight unit includes a light-conductive plate, an elongate lamp for emitting light, an elongate reflecting member for reflecting the light toward the light-reception surface of the light-conductive plate. The reflecting member is formed as an L-shaped member having a front flange extending on the edge portion of the light-emission surface (26a) and a side flange abutting an extension of the reflection sheet extending from the rear surface of the light-conductive plate.

8 Claims, 7 Drawing Sheets

LCD DEVICE HAVING AN IMPROVED BACKLIGHT UNIT

BACKGROUND OF THE INVENTION (a) Field of the Invention

The present invention relates to a liquid crystal display (LCD) device having an improved backlight unit and, more particularly, to the improvement of the structure of the reflecting member in the backlight unit of the LCD device.

(b) Description of the Related Art

The LCD device has the advantages of smaller thickness and lightweight, and thus is used as a flat display panel in a variety of applications. The LCD device generally includes a display panel, a backlight unit for irradiating the display panel from the rear surface thereof and a housing for receiving therein the display panel and the backlight unit in one body so that the front screen of the display panel is exposed from a front opening of the housing.

Figure 1:
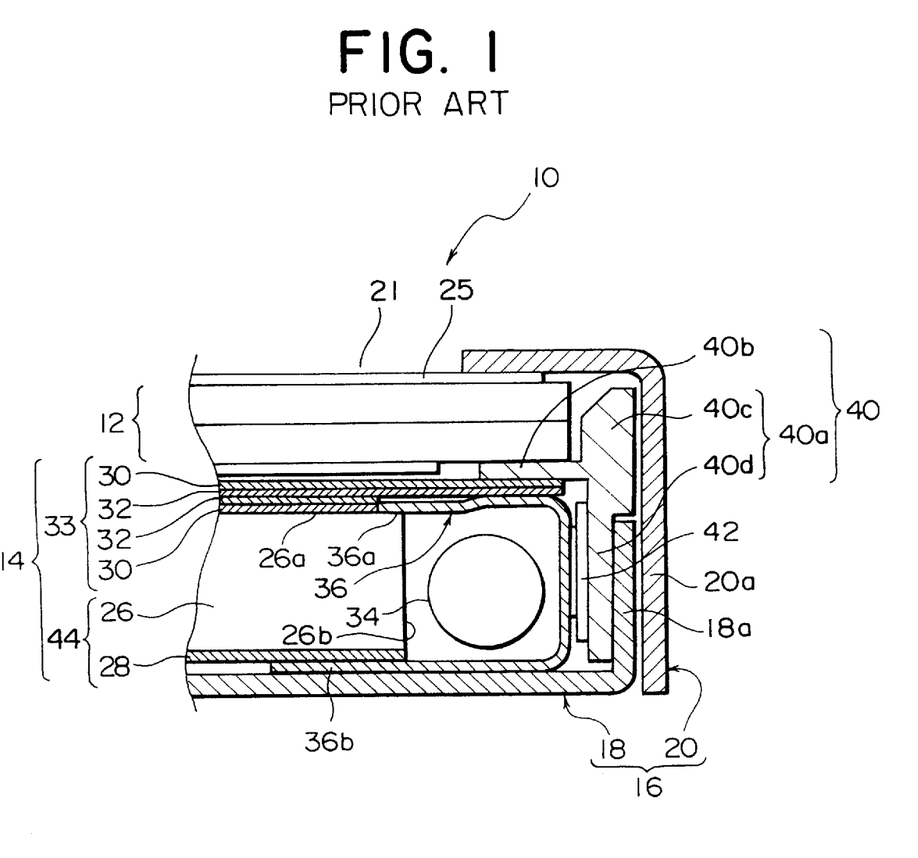
FIG. 1 is a partial sectional view of a conventional LCD device.

FIG. 1 shows the peripheral part of a conventional LCD device, generally designated by numeral 10, which includes a display panel 12 for displaying images on the front screen thereof, a backlight unit 14 disposed at the rear of the display panel 12 for irradiating the display panel 12 from the rear surface thereof, and a housing 16 for receiving therein the display panel 12 and the backlight unit 14 as a single unit.

Figure 2:
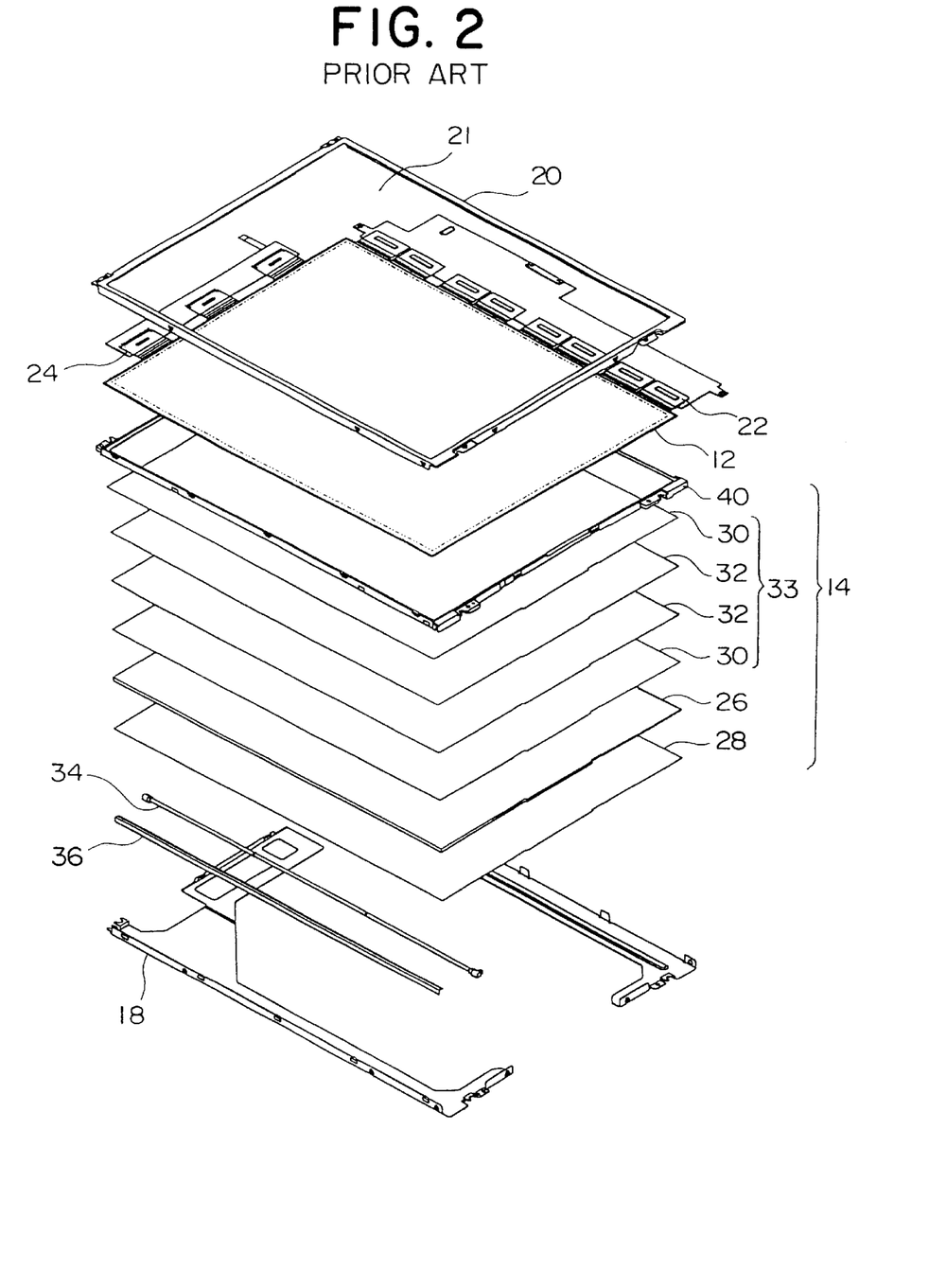
FIG. 2 is a developed view of the laminated structure of the LCD device of FIG. 1.

Referring additionally to FIG. 2 showing the developed configuration of the LCD device of FIG. 1, the housing 16 includes a flat case 18, with a central opening, for receiving therein the backlight unit 14, and a cover 20 for covering the display panel 12 disposed in front of the backlight unit 14. The cover 20 is engaged with the flat case 18 by using an engagement structure so that the cover 20 thrust the display panel 12 toward the backlight unit 14 within the housing 16.

The cover 20 is formed as a metallic frame having an opening 21 for exposing the front screen of the display panel 12 and a side wall 20a having a front rim defining the opening 21. The cover 20 functions also as an electrostatic shield. The display panel 12 includes a polarizing plate 25 as a part thereof, and mounts thereon LCD drivers 22 and 24 at the peripheral area thereof.

The backlight unit 14 includes, as shown in FIG. 1, a light source or elongate lamp 34, an optical-conductive plate 26 having a light-emission front surface 26a and a light-reception side surface 26b adjacent to the elongate lamp 34, a reflection sheet 28 disposed at the rear of the light-conductive plate 26 for reflecting the light within the light-conductive plate 26 toward the light-emission front surface 26b thereof, and a laminated optical layer structure 33 on the front surface 26a of the light-conductive plate 26. The laminated optical layer structure 33 includes, consecutively as viewed from the light-conductive plate 26, a first optical diffusion sheet 30, a first lens sheet 32, a second lens sheet 32, and a second optical diffusion sheet 30.

The optical diffusion sheets 30 have a function for diffusing the light to uniformalize the brightness of the front screen of the display panel 26, whereas the lens sheets 32 have a function for focusing the light toward the front screen of the display panel 26.

The elongate lamp 34 of the backlight unit 14 has a cylindrical shape extending along the light-reception side surface 26b of the light-conductive plate 26 with a gap therebetween. The backlight unit 14 has a U-shaped reflecting member 36 made of a metal for encircling the lamp 34 together with the light-conductive plate 26. The front leg 36a of the reflecting member 36 abuts the first optical diffusion sheet 30 and the first lens sheet 32 on the light-emission surface 26a of the light-conductive plate 26. The rear leg 36b of the reflecting member 36 extends between the reflection sheet 28 and the inner bottom surface of the flat case 18.

Figure 3:
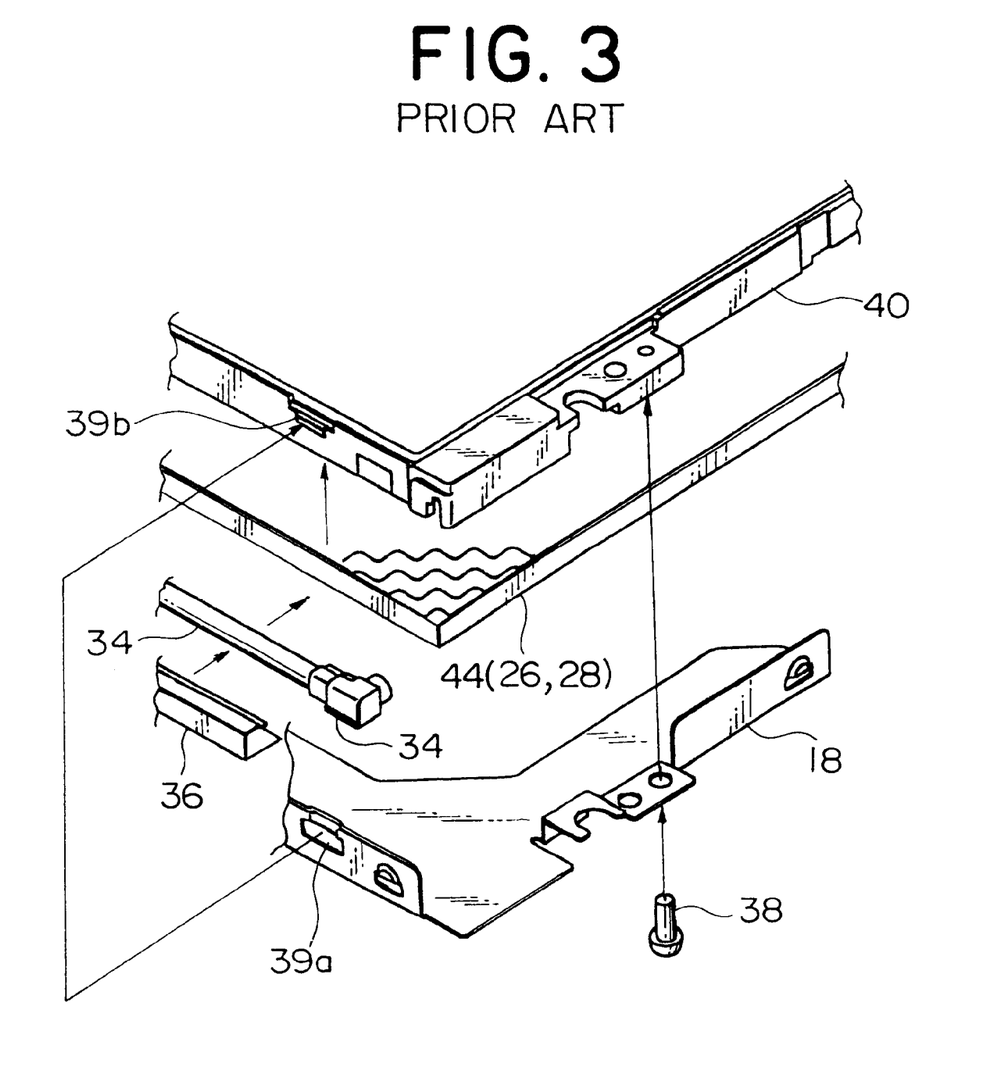
FIG. 3 is a partial perspective view of developed layers of the LCD device of FIG. 1.

As shown in FIG. 3 depicting a portion of FIG. 1, the engagement structure 39 for the flat case 18 and the display panel 12 includes an engagement hole 39a formed in the flat case 18 and a protrusion 39b formed on a molded chassis 40, which is sandwiched between the display panel 12 and the cover 20. The flat case 18 and the molded chassis 40 are coupled by the engagement structure 39 and bolts 38.

The molded chassis 40 is made of plastics and, as shown in FIG. 1, has a side wall 40a including a first portion 40c sandwiched between the display panel 12 and the cover 20 and a second portion 40d disposed in contact with the side wall 18a of the flat case 18 for encircling the backlight unit 14. The molded chassis 40 also has an extension 40b extending from the first portion 40c between the display panel 12 and the backlight unit 14 for buffering the thrust force acting therebetween.

The reflecting member 36 is thrust by the second portion 40d toward the light-conductive plate 26 so that the reflecting member 36 and the second portion 40c sandwich therebetween a low-voltage cable 42 for the lamp 34. The second optical diffusion sheet 30 and the second lens sheet 32 extend between the extension 40b of the molded chassis 40 and the reflecting member 36.

Figure 4:
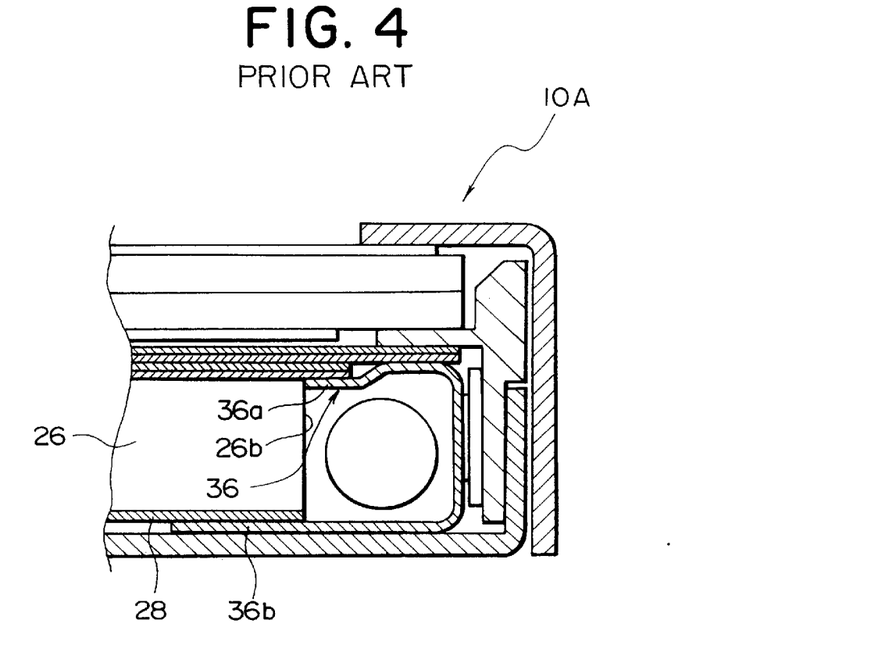
FIG. 4 is a partial sectional view of a modified LCD device modified from FIG. 1.

FIG. 4 shows a modified configuration of the elongate reflecting member 46 in the art, wherein the front leg 36a of the reflecting member 36 abuts the light-reception side surface 26b of the light-conductive plate 26.

For assembly of the LCD device of FIG. 1, the lamp 34 is first received in the reflecting member 36, which is then attached to the laminated body 44 including the reflection sheet 28 and the light-conductive plate 26, and the resultant components are held by the molded chassis 40 within the flat case 18.

Subsequently, the flat case 18 and the molded chassis 40 are fixed together by the bolts 38 and the engagement structure 39, followed by stacking thereon the optical layer structure 33 including the optical diffusion sheets 30 and the lens sheets 32. Thus, the backlight unit 14 is fabricated.

Thereafter, the display panel 12 mounting thereon the LCD drivers 22 and 24 is stacked onto the emission surface of the backlight unit 14, followed by disposing the cover 20 onto the display panel 12 and fixed to the flat case 18 by using the engagement and fixing mechanisms.

In the conventional LCD device as described above, there are some drawbacks to be removed.

First, the light-conductive plate 26 is liable to damages at the light-emission surface 26a or the light-receptions surface 26b when the reflecting member 36 receiving therein the lamp 34 is attached to the laminated body 44. This degrades the product throughput of the LCD device.

Second, the fabrication steps for the LCD device including the step of attaching the reflecting member 36 to the light-conductive plate 26 are complicated, and thus automated fabrication is difficult to achieve.

Third, the overall thickness of the LCD device is not satisfactorily small enough.

Fourth, the gap or space between the lamp 34 and the reflecting member 36 is not satisfactorily large enough. This limits the amount of emitted light from the lamp 34 to be reflected by the reflecting member 36 toward the light-reception surface 26b.

In the conventional techniques, such as described in JP-A-10-162617, -7-49497, -6-347784 and UM-A-6-87937, the above drawbacks in the LCD device are not removed.

SUMMARY OF THE INVENTION

It is an object of the present invention to solve at least one of the drawbacks as recited above and thereby provide an LCD device having an improved structure in relation to the backlight unit.

The present invention provides, in one aspect thereof, a liquid crystal display (LCD) device including a display panel having a display screen at a font side thereof, a backlight unit disposed at a rear side of the display panel for irradiating the display panel at the rear side thereof, and a housing for holding the display panel and the backlight unit in one body, the backlight unit including a light-conductive plate having a light-emission front surface and a light-reception side surface, an elongate lamp extending along the light-reception side surface for emitting light at the light-reception side surface, a reflection sheet disposed at a rear side of the light-conductive plate and the elongate lamp for reflecting the light toward the light-emission surface, and an elongate reflecting member extending substantially parallel to the elongate lamp and formed as an L-shaped member as viewed along an extending direction of the reflecting member, the L-shaped member including a front flange portion disposed in front of the elongate lamp and a side flange portion normal to the front screen for reflecting light from the elongate lamp in association with the reflection sheet.

The LCD device of the first aspect of the present invention alleviates the first through third drawbacks of the conventional LCD device as recited above, due to the L-shaped configuration of the elongate reflecting member. More specifically, the absence of the rear flange portion or rear leg reduces the overall thickness of the LCD device, and also reduces the possibility of the damage on the light-conductive plate after attachment of the light-conductive plate onto the elongate reflecting member. This allows an automated assembly of the LCD device without degrading the throughput thereof.

The present invention also provides, in another aspect thereof, a liquid crystal display (LCD) device including a display panel having a display screen at a font side thereof, a backlight unit disposed at a rear side of the display panel for irradiating the display panel at the rear side thereof, and a housing for holding the display panel and the backlight unit in one body, the backlight unit including a light-conductive plate having a light-emission front surface and a light-reception side surface, an elongate lamp extending along the light-reception side surface for emitting light at the light-reception side surface, a reflection sheet disposed at a rear side of the light-conductive plate and the elongate lamp for reflecting the light toward the light-emission surface, and an elongate reflecting member for reflecting the light toward the light-reception side surface, the elongate reflecting member extending substantially parallel to the elongate lamp and formed as a U-shaped member as viewed along an extending direction of the reflecting member, the U-shaped member including a front leg disposed in front of the elongate lamp and a rear leg disposed at a rear side of the elongate lamp, the housing having a cutout for allowing the rear leg of the elongate reflecting member to be substantially flush with a rear surface of said housing.

The LCD device of the second aspect of the present invention alleviates the fourth drawback of the LCD device as recited above. More specifically, the cutout of the housing allows the space between the elongate lamp and the reflecting member to be enlarged without increasing the overall thickness of the LCD device.

The term "U-shaped member" as used herein means that the U-shaped member has a pair of leg portions substantially parallel to each other and a bridge portion bridging both the leg portions together. The corners of the U-shaped member may be round or edged. The term "L-shaped member" as used herein means that the L-shaped member has a pair of flange portions forming therebetween substantially a right angle. The corner may be round or edged.

PREFERRED EMBODIMENTS OF THE INVENTION

Before describing the preferred embodiments of the present invention, the principle of the present invention will be described hereinafter for a better understanding of the present invention.

The present inventor found that the cause of the first drawback as recited above resided in the structure of the U-shaped reflecting member. More specifically, when the light-conductive plate 26 is advanced between the legs of the U-shaped reflecting member 36 for assembly, the legs contact the light reception surface 26b and then the light emission surface 26a of the light-conductive plate 26 to thereby damage the light-conductive plate 26. By changing the U-shaped reflecting member 36 to an L-shaped reflecting member, the damage of the light-conductive plate 26 could be reduced in the LCD device for improvement of the product throughput of the LCD device.

The L-shaped reflecting member also alleviated the second and third drawbacks as recited above.

The reflecting members used in the embodiments of the present invention can be formed by using conventional technique, although the shapes of the reflecting members are somewhat different from those of the reflecting member in the conventional LCD device.

The combination of the L-shaped reflecting member and the reflection sheet extending beyond the light-reception side surface of the light-conductive plate to the rear side of the elongate lamp in the first aspect of the present invention allows the light emitted by the elongate lamp to be efficiently reflected toward the light-reception side surface of the light-conductive plate.

The present inventor also found that the cause of the fourth drawback could be removed by modifying the flat case of the housing to have a cutout therein for receiving therein the rear leg of the reflecting member.

Now, the present invention is more specifically described with reference to accompanying drawings, wherein similar constituent elements are designated by similar reference numerals throughout the drawings.

Figure 5:
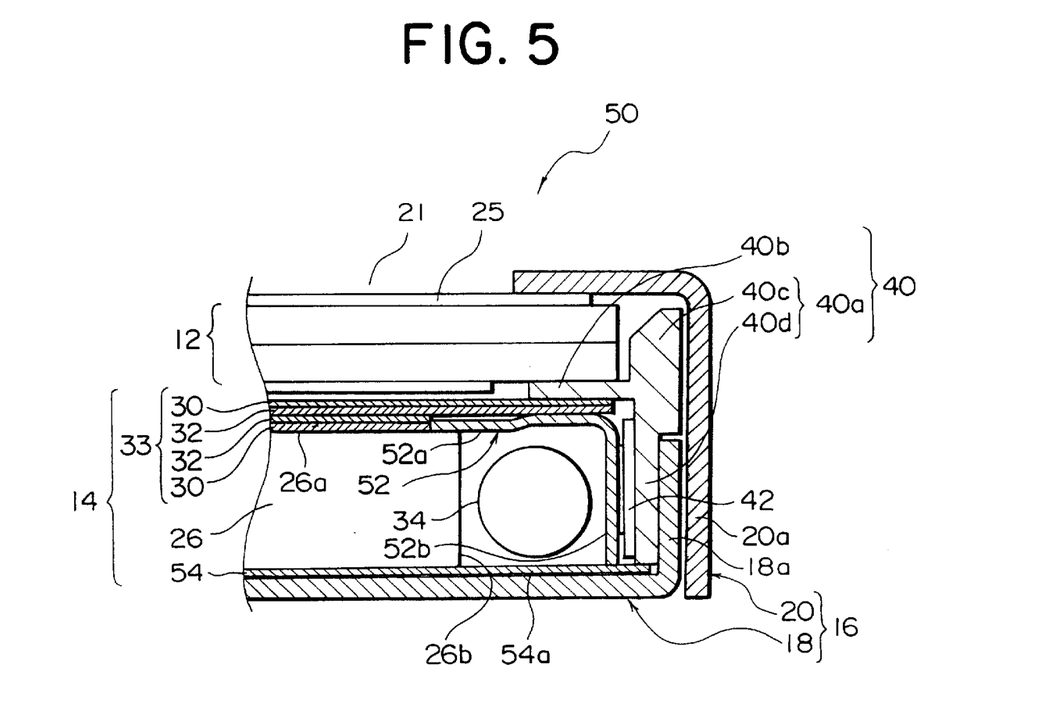
FIG. 5 is a partial sectional view of a LCD device according to a first embodiment of the present invention.

Referring to FIG. 5, a LCD device, generally designated by numeral 50, according to a first embodiment of the present invention is an example of the first aspect of the present invention. The configurations of the LCD device 50 are similar to the configurations of the conventional LCD device 10 described with reference to FIGS. 1 to 3 except for the elongate reflecting member and the reflection sheet.

Thus, the present embodiment is described hereinafter in connection with the configuration of the elongate reflecting member 52 and the reflection sheet 54, whereas the description of other configurations in the conventional LCD device 10 with reference to FIGS. 1 to 3 is incorporated herein for avoiding duplication.

In FIG. 5, the reflection sheet 54 stacked on the light-conductive plate 26 has an extension 54a, which extends beyond the light-reception surface 26b of the light-conductive plate 26 and the elongate lamp 34 to reach the bottom edge of the side wall 40a of the molded chassis 40.

The elongate reflecting member 52 is made of metallic plate configured to form an L-shaped member as viewed along the extending direction of the reflecting member 52. The front flange 52a of the L-shaped member 52 extends on the edge portion of the light-emission surface 26a of the light-conductive plate 26, abutting the edges of the first optical diffusion sheet 30 and the first lens sheet 32 which are consecutively formed on the light-emission surface 26a. The side flange 52b of the L-shaped member 52 extends parallel to the light-reception side surface 26b of the light-conductive plate 26, with the elongate lamp 34 extending therebetween. The side flange 52b abuts the front surface of the extension 54a of the reflection sheet 54.

The front flange 52a has at the central portion thereof an offset toward the front side of the LCD device 50, as viewed from the light-reception surface toward the corner of the L-shaped reflecting member 52. This enlarges the space between elongate lamp 34 and the reflecting member 52, whereby the light reflected by the reflecting member 52 is more efficiently introduced in the light-conductive plate.

Figure 6:
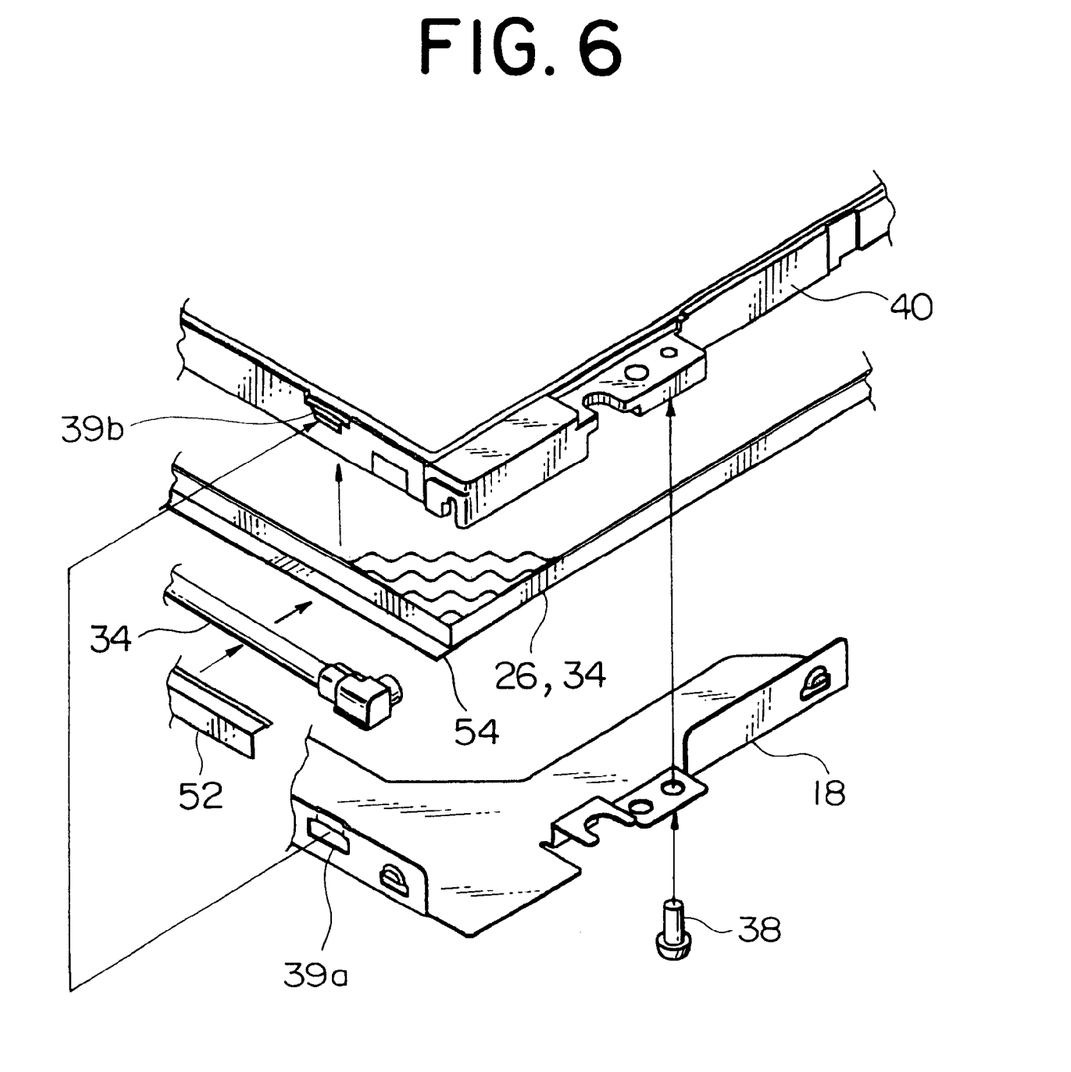
FIG. 6 is a partial perspective view of developed layers of the LCD device of FIG. 5.

For assembly of the LCD device 50, as shown in FIG. 6, the reflection sheet 54 and the optical laminated sheets 34 are attached onto the rear and front surfaces, respectively, of the light-conductive plate 26, then the lamp 34 is positioned with respect to the light-conductive plate 26, and the reflecting member 52 is arranged for covering the elongate lamp 34. The subsequent fabrication steps are similar to those as described in connection with the conventional LCD device.

The L-shaped configuration of the reflecting member 52 allows the damages of the light-conductive plate 26 caused by the reflecting member 52 to be reduced significantly, which enables feasibility of automated fabrication of the LCD device. The abutment of the side flange 52b of the L-shaped member 52 against the extension 54a of the reflection sheet 54 prevents the deviation or rolling of the reflection sheet 54 by a mechanical strength. The absence of the rear leg of the reflecting member residing the rear side of the light-conductive plate 26 allows a smaller overall thickness of the resultant LCD device.

Figure 7:
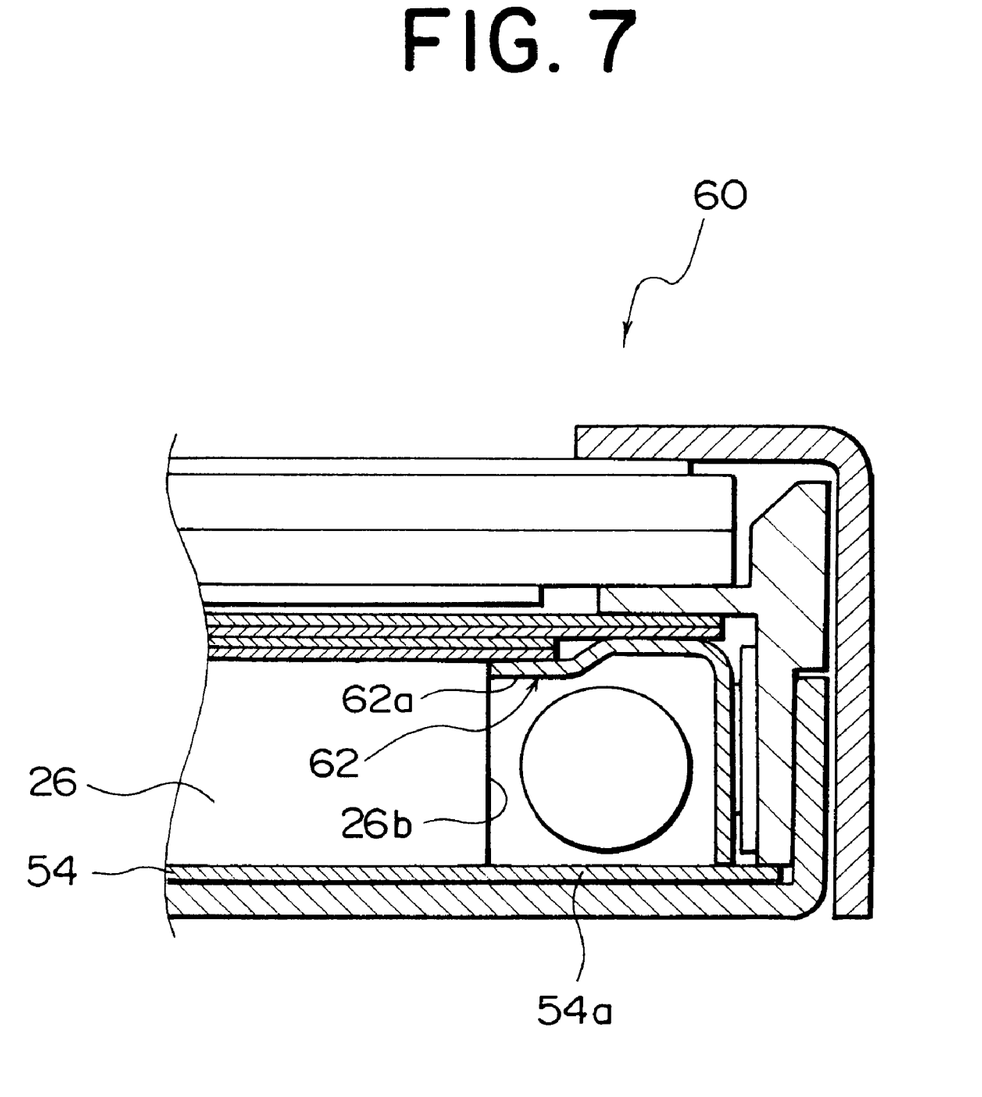
FIG. 7 is a sectional view of a modified LCD device modified from FIG. 5.

Referring to FIG. 7, a modification of the LCD device, designated by numeral 60, modified from the first embodiment is such that the front flange 62a of the L-shaped reflecting member 62 abuts the front edge of the light-reception side surface 26b of the light-conductive plate 26. This configuration enables further feasibility of the automated fabrication due to the positional relationship between the reflecting member 52 and the light-conductive plate 26.

Figure 8:
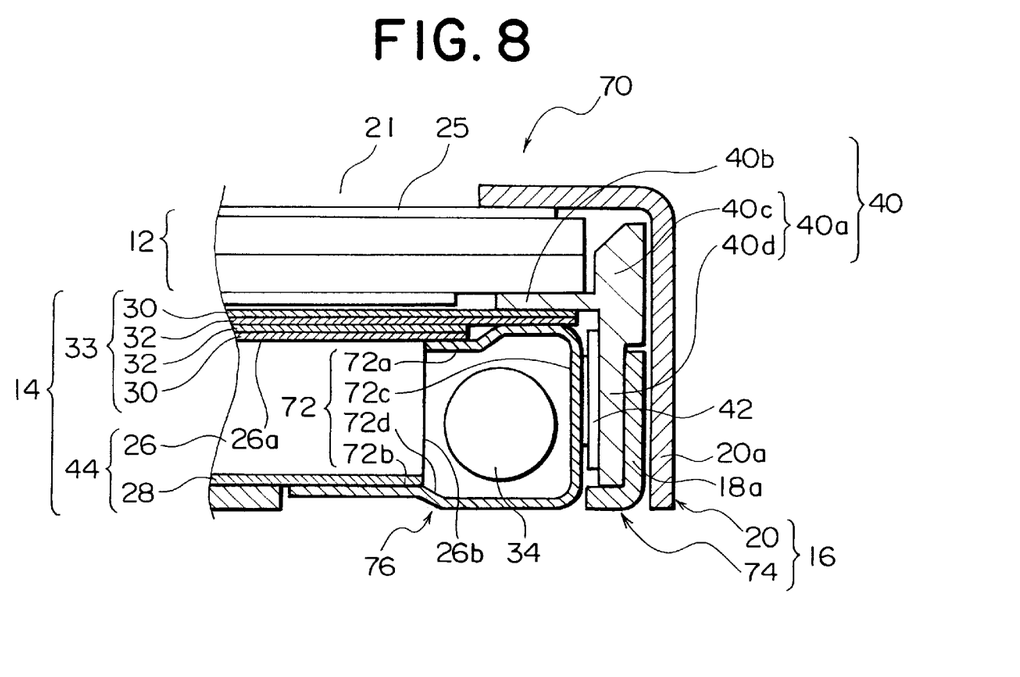
FIG. 8 is a partial sectional view of a LCD device according to a second embodiment of the present invention.

Referring to FIG. 8, a LCD device, generally designated by numeral 70, according to a second embodiment of the present invention is similar to the first embodiment except for the configurations of the reflecting member and the flat case.

More specifically, the elongate reflecting member 72 is configured as a U-shaped member having a front leg 72a, a rear leg 72b and a bridge 72c, similarly to the reflecting member in the conventional LCD device. The flat case 74 of the housing 16 has a cutout 76 for receiving therein the rear leg 72b of the U-shaped reflecting member 72. The front leg 72a has an edge on the light-emission surface 26a of the light-conductive plate 26, whereas the rear leg 72b extends on the rear surface of the reflection sheet 28. The reflection sheet 28 has no extension such as 54a in the fidt embodiment. Each of the front leg 72a and the rear leg 72b has at the central portion thereof an offset, such as 72d, for a larger space between the reflecting member 74 and the lamp 34. The outer surface of the rear leg 72b of the reflecting member 72 is substantially flush with the rear surface of the flat case 74.

The cutout 76 of the flat case 74 allows a larger space between the reflecting member 72 and the lamp 34, and enables a larger amount of light to be introduced into the light-conductive plate 26. Thus, the brightness of the LCD device 70 can be improved.

Figure 9:
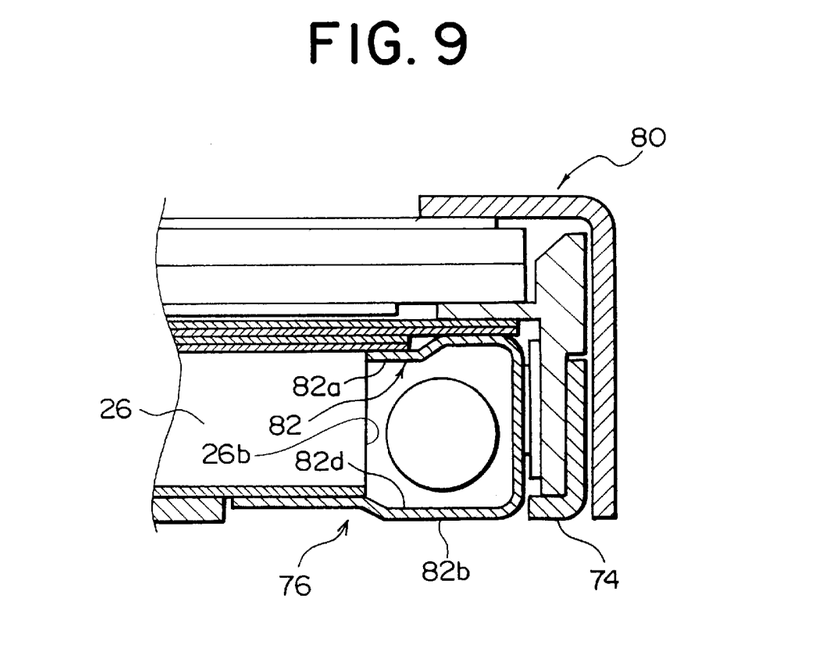
FIG. 9 is a partial sectional view of a modified LCD device modified from FIG. 8.

Referring to FIG. 9, a modification of the LCD device, generally designated by numeral 80, modified from the second embodiment is such that the front leg 82a of the U-shaped reflecting member 82 abuts the front edge of the light-reception side surface 26b of the light-conductive plate 26. This configuration allows further feasibility of attachment of the reflecting member 82.

Since the above embodiments are described only for examples, the present invention is not limited to the above embodiments and various modifications or alterations can be easily made therefrom by those skilled in the art without departing from the scope of the present invention.

What is claimed is:

1. A liquid crystal display (LCD) device comprising a display panel having a display screen at a font side thereof, a backlight unit disposed at a rear side of said display panel for irradiating said display panel at said rear side thereof, and a housing for holding said display panel and said backlight unit in one body, said backlight unit including a light-conductive plate having a light-emission front surface and a light-reception side surface, an elongate lamp extending along said light-reception side surface for emitting light at said light-reception side surface, a reflection sheet disposed at a rear side of said light-conductive plate for reflecting the light toward said light-emission front surface and having an extension disposed at a rear side of said elongate lamp, and an elongate reflecting member extending substantially parallel to said elongate lamp and formed as an L-shaped member as viewed along an extending direction of said reflecting member, said L-shaped member including a front flange portion disposed in front of said elongate lamp and a side flange portion normal to said front flange portion, said reflecting member reflecting the light from said elongate lamp in association with said reflection sheet.

2. The LCD device as defined in claim 1, wherein said front flange portion has an edge passing said light-reception side surface to said light-emission front surface as viewed from the front side of said display panel.

3. The LCD device as defined in claim 2, further comprising laminated sheets sandwiched between said display panel and said light-conductive plate, wherein said laminated sheets include at least one optical diffusion sheet and at least one lens sheet, and said front flange portion abuts an edge of one of said at least one optical diffusion sheet and an edge of one of said at least one lens sheet.

4. The LCD device as defined in claim 1, wherein said front flange portion abuts said light-reception side surface and said side flange portion abuts said extension of said reflection sheet.

5. The LCD device as defined in claim 1, wherein said housing includes a case receiving therein said backlight unit and a cover for thrusting said display panel against said backlight unit.

6. A liquid crystal display (LCD) device comprising a display panel having a display screen at a font side thereof, a backlight unit disposed at a rear side of said display panel for irradiating said display panel at said rear side thereof, and a housing for holding said display panel and said backlight unit in one body, said backlight unit including a light-conductive plate having a light-emission front surface and a light-reception side surface, an elongate lamp extending along said light-reception side surface for emitting light at said light-reception side surface, a reflection sheet disposed at a rear side of said light-conductive plate for reflecting the light toward said light-emission surface, and an elongate reflecting member for reflecting the light toward said light-reception side surface, said elongate reflecting member extending substantially parallel to said elongate lamp and formed as a U-shaped member as viewed along an extending direction of said reflecting member, said U-shaped member including a front leg disposed in front of said elongate lamp and a rear leg disposed at a rear side of said elongate lamp, said housing having a cutout for allowing said rear leg of said elongate reflecting member to be flush with a rear surface of said housing.

7. The LCD device as defined in claim 6, further comprising laminated sheets sandwiched between said display panel and said light-conductive plate, wherein said laminated sheets include at least one optical diffusion sheet and at least one lens sheet, and said front leg extends on said light-emission front surface and abuts an edge of one of said at least one optical diffusion sheet and an edge of one of said at least one lens sheet.

8. The LCD device as defined in claim 6, wherein said front leg abuts said light-reception side surface, and said rear leg extends on said rear surface of said light-conductive plate.

\* \* \* \* \*